US012596611B2

(12) United States Patent
Ko

(10) Patent No.: US 12,596,611 B2
(45) Date of Patent: Apr. 7, 2026

(54) MEMORY SYSTEM AND MEMORY MANAGEMENT METHOD THEREOF

(71) Applicant: NUVOTON TECHNOLOGY CORPORATION, Hsinchu City (TW)

(72) Inventor: Pao-Chen Ko, Zhubei City (TW)

(73) Assignee: NUVOTON TECHNOLOGY CORPORATION, Hsinchu City (TW)

( * ) Notice: Subject to any disclaimer, the term of this patent is extended or adjusted under 35 U.S.C. 154(b) by 0 days.

(21) Appl. No.: 18/802,199

(22) Filed: Aug. 13, 2024

(65) Prior Publication Data

US 2025/0225026 A1     Jul. 10, 2025

(30) Foreign Application Priority Data

Jan. 10, 2024    (TW) ................................. 113101014

(51) Int. Cl.
*G06F 11/10* (2006.01)
(52) U.S. Cl.
CPC ...... *G06F 11/1016* (2013.01); *G06F 11/1068* (2013.01)
(58) Field of Classification Search
CPC .......................... G06F 11/1016; G06F 11/1068
USPC ......................................................... 714/764
See application file for complete search history.

(56) References Cited

U.S. PATENT DOCUMENTS

| | | | | |
|---|---|---|---|---|
| 2003/0105799 A1 * | 6/2003 | Khan | .................. | G06F 15/7842 |
| | | | | 709/201 |
| 2011/0213945 A1 * | 9/2011 | Post | ........................ | G06F 3/061 |
| | | | | 711/E12.002 |
| 2012/0030542 A1 * | 2/2012 | Borchers | ............. | G06F 12/0813 |
| | | | | 714/764 |

FOREIGN PATENT DOCUMENTS

| | | | | | |
|---|---|---|---|---|---|
| CN | 102394101 A | * | 3/2012 | ......... | G11C 11/5657 |
| CN | 104360958 A | * | 2/2015 | | |

* cited by examiner

*Primary Examiner* — Albert Decady
*Assistant Examiner* — Enam Ahmed
(74) *Attorney, Agent, or Firm* — MUNCY, GEISSLER, OLDS & LOWE, P.C.

(57) ABSTRACT

A memory system including a memory; an encoding management circuit; and a memory access instruction decoding unit is provided. The memory access instruction decoding unit is configured to receive an instruction from a bus, identify a bad block in the memory, determine whether the instruction indicates access to the bad block. When the instruction indicates writing data to the bad block, the memory access instruction decoding unit outputs an address of the bad block and the data to the encoding management circuit to trigger the encoding management circuit to update the encoding management circuit. When the instruction indicates reading the bad block, the memory access instruction decoding unit outputs the address to and trigger the encoding management circuit to output simulation data of the bad block, wherein the encoding management circuit obtains the simulation data based on the address.

9 Claims, 4 Drawing Sheets

| | | |
|---|---|---|
| 1 | Sum(0) | K=0 |
| 2 | Sum(1) | K=A'B' |
| 3 | Sum(2) | K=AB' |
| 4 | Sum(3) | K=A'B |
| 5 | Sum(4) | K=AB |
| 6 | Sum(1,2) | K=B' |
| 7 | Sum(1,3) | K=A' |
| 8 | Sum(1,4) | K=A'B'+AB |
| 9 | Sum(2,3) | K=AB'+A'B |
| 10 | Sum(2,4) | K=A |
| 11 | Sum(3,4) | K=B |
| 12 | Sum(1,2,3) | K=A'+B' |
| 13 | Sum(1,2,4) | K=A+B' |
| 14 | Sum(1,3,4) | K=A'+B |
| 15 | Sum(2,3,4) | K=A+B |
| 16 | Sum(1,2,3,4) | K=1 |

Digital circuit 400

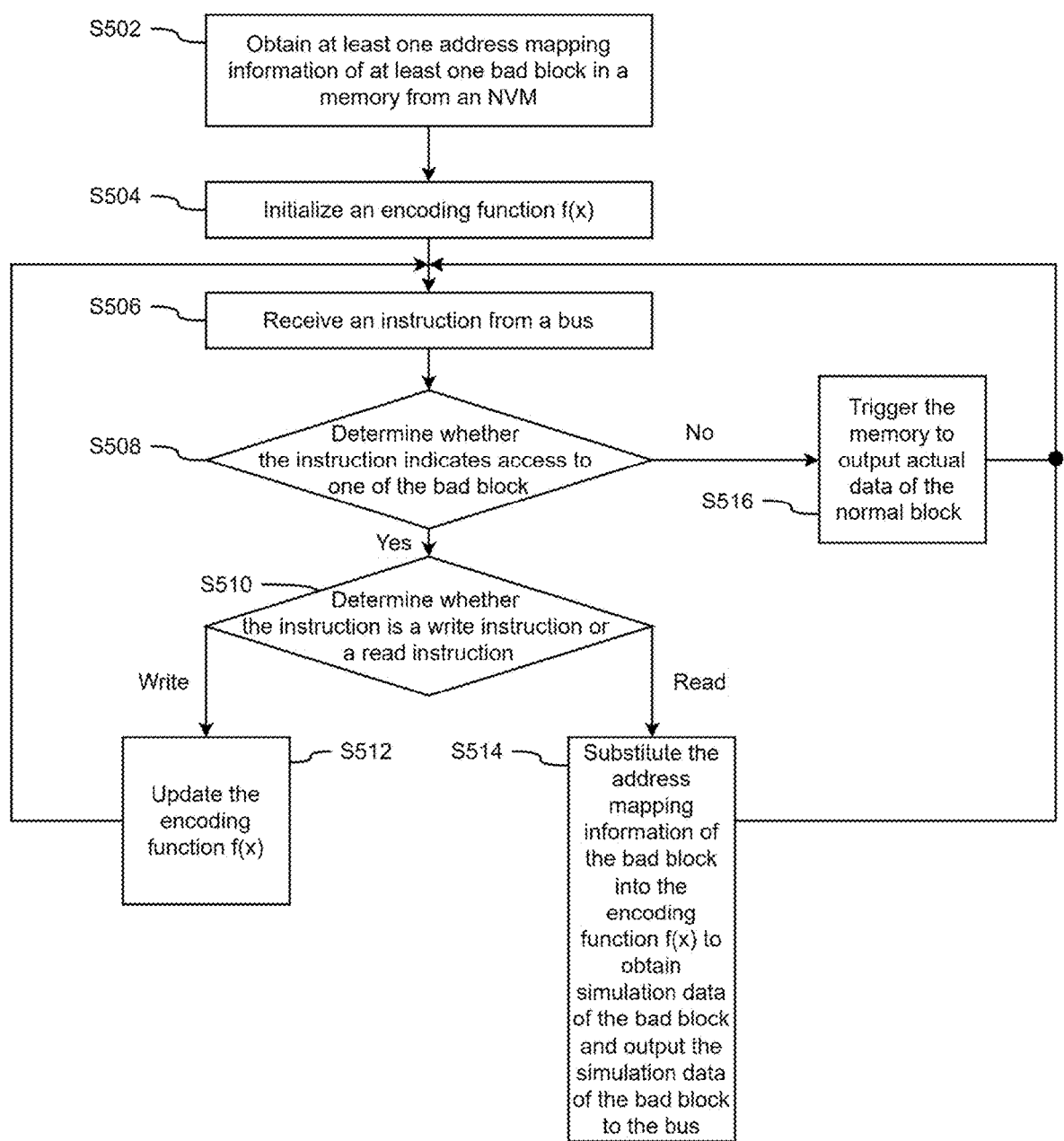

S502 — Obtain at least one address mapping information of at least one bad block in a memory from an NVM S504 — Initialize an encoding function f(x)

S506 — Receive an instruction from a bus

S508 — Determine whether the instruction indicates access to one of the bad block No S516 — Trigger the memory to output actual data of the normal block Yes S510 — Determine whether the instruction is a write instruction or a read instruction Write Read S512 — Update the encoding function f(x)

S514 — Substitute the address mapping information of the bad block into the encoding function f(x) to obtain simulation data of the bad block and output the simulation data of the bad block to the bus

FIG. 5

MEMORY SYSTEM AND MEMORY MANAGEMENT METHOD THEREOF

CROSS-REFERENCE TO RELATED APPLICATION

This application claims the priority from the TW Patent Application No. 113101014, filed on Jan. 10, 2024, and all contents of such TW Patent Application are comprised in the present disclosure.

BACKGROUND

1. Field of the Invention

The present disclosure relates to memory technologies, and in particular to a memory management method for handling bad blocks and a memory system.

2. Description of the Related Art

Generally, idle/spare units (e.g., spare cells) are allocated to a memory (e.g., random access memory (RAM)) including bad blocks. Before the shipping of the chip/integrated circuit (IC), the bad blocks are one-to-one mapped to the spare units. However, as the demand for memory space increases, the memory in the chip expands, and the failure rate may accordingly rise. Allocating more spare units can enhance reliability but may occupy available space and add to the cost burden. In contrast, allocating fewer spare units may result in an inability to repair bad blocks.

Thus, how to effectively handle (e.g., manage, repair) the memory including bad blocks is a problem to be solved.

SUMMARY

In order to solve the above technical problems, the present disclosure provides a memory management method for handling bad blocks and a memory system to manage and repair the bad blocks in a memory when the memory is not allocated with idle/spare units.

Embodiments of the present disclosure provide a memory system, including: a memory; an encoding management circuit; and a memory access instruction decoding unit, signally connected to the memory and the encoding management circuit, and configured to: receive an instruction from a bus; identify a bad block in the memory; determine whether the instruction indicates accessing to the bad block; when the instruction indicates writing data to the bad block, output an address of the bad block and the data to the encoding management circuit to trigger the encoding management circuit to update the encoding management circuit; and when the instruction indicates reading the bad block, output the address of the bad block to the encoding management circuit to trigger the encoding management circuit to output simulation data of the bad block, wherein the encoding management circuit obtains the simulation data of the bad block based on the address of the bad block.

Embodiments of the present disclosure further provide a memory management method, including: receiving an instruction from a bus, by a memory access instruction decoding unit; identifying a bad block in a memory, by the memory access instruction decoding unit; determining whether the instruction indicates accessing to the bad block, by the memory access instruction decoding unit; when the instruction indicates writing data to the bad block, outputting an address of the bad block and the data to an encoding management circuit, by the memory access instruction decoding unit, and updating the encoding management; and when the instruction indicates reading the bad block, outputting the address of the bad block to the encoding management circuit, by the memory access instruction decoding unit, obtaining simulation data of the bad block based on the address of the bad block and outputting the simulation data of the bad block, by the encoding management circuit.

Based on the above, the memory management method for handling bad blocks and the memory system provided by the present disclosure may achieve the repair and management of the bad blocks in the memory by employing an encoding method when the memory is not allocated with idle/spare units, thereby reducing costs.

BRIEF DESCRIPTION OF THE DRAWINGS

The drawings are provided to make the persons with ordinary knowledge in the field of the art further understand the present disclosure, and are incorporated into and constitute a part of the specification of the present disclosure. The drawings illustrate demonstrated embodiments of the present disclosure, and are used to explain the principal of the present disclosure together with the description of the present disclosure.

FIG. 5 is a schematic flowchart diagram of a memory management method for handling memory bad blocks according to an embodiment of the present disclosure.

DESCRIPTION OF THE PREFERRED EMBODIMENTS

Figure 1:
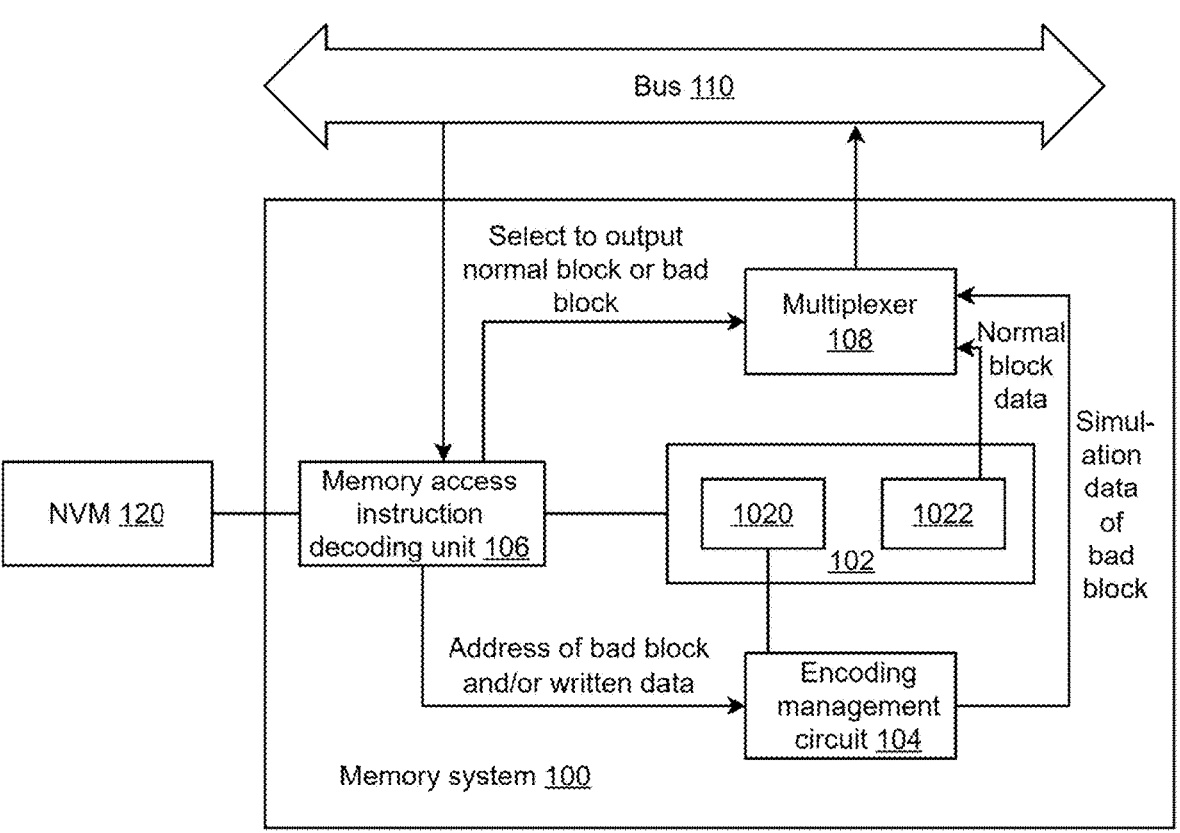
FIG. 1 is a schematic block diagram of a memory system according to an embodiment of the present disclosure.

To address the above technical problems, embodiments of the present disclosure provide a memory management method for handling bad blocks and a memory system. Reference will now be made in detail to exemplary embodiments of the present disclosure, which will be illustrated in the accompanying drawings. Where possible, the same reference symbols are used in the drawings and the description to refer to the same or similar components. In addition, the implementation of the exemplary embodiment is only one of the realization ways of the design concept of the present disclosure, and the following examples are not intended to limit the present disclosure.

FIG. 1 is a schematic block diagram of a memory system according to an embodiment of the present disclosure. The memory system 100 includes the memory 102, the encoding management circuit 104, and the memory access instruction decoding unit 106. The memory access instruction decoding unit 106 is signally connected to the memory 102 and the encoding management circuit 104. The encoding management circuit 104 may be a field-programmable gate array (FPGA), but the present disclosure is not limited thereto. The memory 102 may be a random access memory (RAM), but the present disclosure is not limited thereto. Digital circuits may be replaced with logic circuits or combinational circuits, but the present disclosure is not limited thereto.

The memory access instruction decoding unit 106 is used to receive an (access) instruction from the bus 110, identify (or detect) the (at least one) bad block 1020 in the memory 102, and determine whether the instruction indicates access to the bad block 1020. When the instruction indicates writing data to the bad block 1020, the memory access instruction decoding unit 106 outputs an address of the bad block and the data to the encoding management circuit 104, to trigger the encoding management circuit 104 to update the encoding management circuit 104. The encoding management circuit 104 may update (e.g., internal component(s) of) the encoding management circuit 104 based on the address of the bad block and data. When the instruction indicates reading the bad block 1020, the memory access instruction decoding unit 106 outputs the address of the bad block to the encoding management circuit 104, to trigger the encoding management circuit 104 to output simulation data of the bad block, wherein the encoding management circuit obtains the simulation data of the bad block based on the address of the bad block. That is, the simulation data of the bad block may be used for replacing the (erroneous) output data DOUT of the bad block.

In some embodiments, the memory system may include the multiplexer 108 signally connected to the memory 102, the encoding management circuit 104, and the memory access instruction decoding unit 106. When the instruction indicates reading the bad block 1020, the multiplexer 108 may (e.g., be triggered by the memory access instruction decoding unit 106 to) receive the simulation data of the bad block from the encoding management circuit 104 and output the simulation data of the bad block to the bus 110. In some embodiments, the multiplexer 108 may receive the output data DOUT of the bad block.

In some embodiments, when the instruction indicates reading the normal block 1022 in the memory 102, the multiplexer 108 may receive actual data DOUT stored in the normal block 1022 from the memory 102 and output the actual data DOUT to the bus 110.

In some embodiments, the memory access instruction decoding unit 106 may identify the bad block 1020 by reading a non-volatile memory (NVM) or by performing dynamic detection on the memory 102. The dynamic detection may include at least one of detection in response to receiving the instruction and periodic detection. Specifically, bad blocks in the memory may be identified through built-in self-test (BIST) operation/function and accordingly stored in NVM. The BIST operation may be performed during the final testing (FT) phase before the shipping of the chip (i.e., predetermined/predefined). In addition, the BIST operation may be performed during the process of accessing memory (i.e., real-time detection), such as by comparing whether the data written to the block matches the output data DOUT. It should be noted that dynamic detection may identify newly added bad blocks (compared to the predetermined bad blocks).

Figure 2:
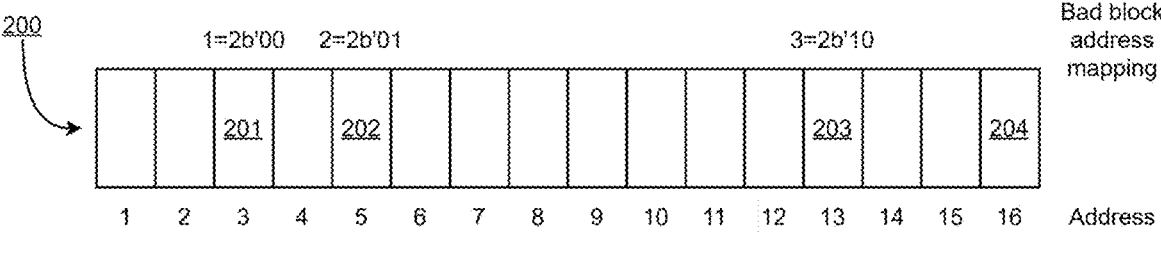
FIG. 2 is a schematic diagram of bad block address mapping used for memory according to an embodiment of the present disclosure.

In some embodiments, the memory access instruction decoding unit 106 may obtain information of the bad block 1020 by reading the NVM or by performing the dynamic detection on the memory 102. The information may include at least one of the address of the bad block 1020 and address mapping information (e.g., indices). FIG. 2 is a schematic diagram of bad block address mapping used for memory 200 according to an embodiment of the present disclosure. Please refer to FIG. 2, the memory 200 having 16 bits includes the bad block 201 at the 3rd bit, the bad block 202 at the 5th bit, and the bad block 203 at the 14th bit. Data of the bad blocks 201, 202, and 203 are inaccessible. Each of the bad blocks 201, 202, and 203 may apply a 2-bit address {A,B}. These bad blocks are mapped (e.g., encoded addressing) to 1=2'b00, 2=2'b01, and 3=2'b10, respectively.

In some embodiments, when a newly added bad block (compared to the predefined bad block(s)) is identified, address mapping information of the newly added bad block may be generated (e.g., by the encoding management circuit 104). For example, when identifying that the block 204 at the 16th bit (e.g., originally a normal block during the shipping) becomes a bad block, the encoding management circuit 104 may map (e.g., encode addressing) the block 204 to 4=2'b11 and store it in the NVM.

In some embodiments, the encoding management circuit 104 may output the simulation data of the bad block as the simulation data of the bad block. Specifically, the bandwidth of the bus is fixed, and thus the bus only accesses single data/bit at a time. Thus, all bad blocks in the memory may be managed based on the encoding management circuit 104 and the memory access instruction decoding unit 106 provided by the present disclosure. For example, assuming correct data/values of bad blocks 201, 202, and 203 should be "0", "1", and "1", respectively. When the bus indicates reading the data of the bad block 202, the encoding management circuit may simultaneously output "1" for the bad blocks 201, 202, and 203. Since the bus does not read the bad blocks 201 and 203 at the same time (i.e., bad blocks 201 and 203 are disabled), outputting "1" for the bad block 201 does not cause a reading error. Similarly, when the bus indicates reading the data of the bad block 201, the encoding management circuit may simultaneously output "0" for the bad blocks 201, 202, and 203. Since the bus does not read the bad blocks 202 and 203 at the same time (i.e., bad blocks 202 and 203 are disabled), outputting "0" for the bad blocks 202 and 203 does not cause a reading error.

In some embodiments, the encoding management circuit 104 may include a digital circuit. Please refer to FIGS. 1, 3, and 4.

Figure 3:
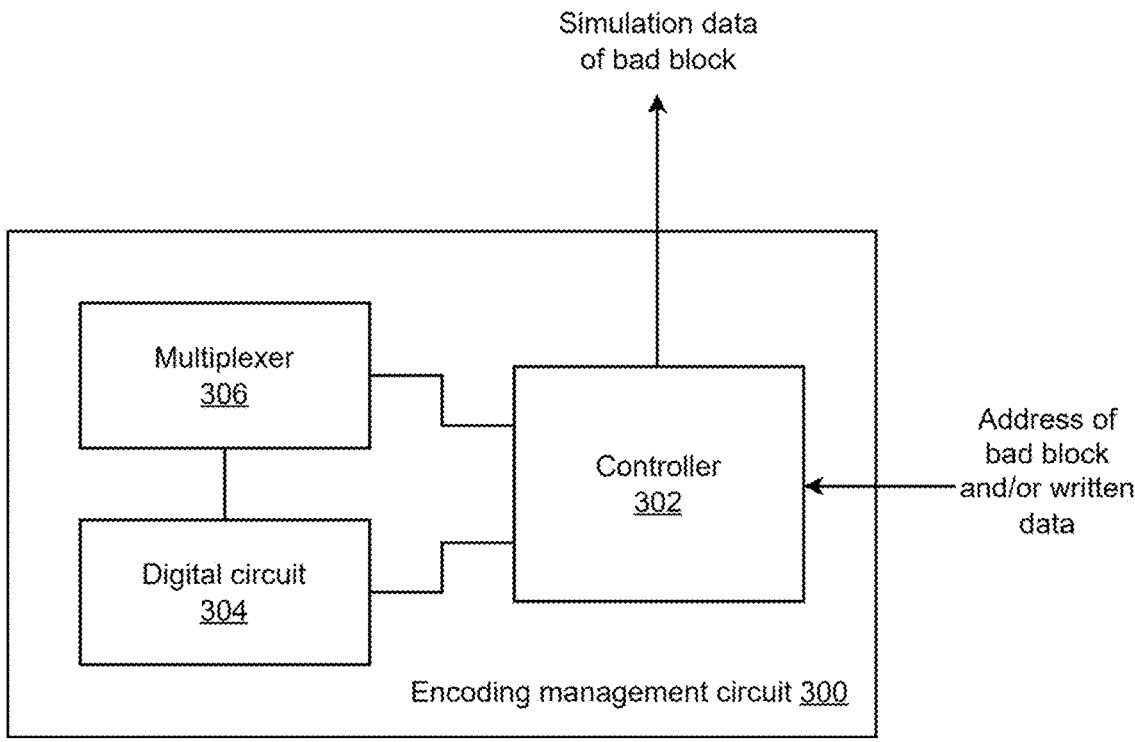
FIG. 3 is a schematic block diagram of an encoding management circuit according to an embodiment of the present disclosure.

FIG. 3 is a schematic block diagram of an encoding management circuit 300 according to an embodiment of the present disclosure. The encoding management circuit 300 (which may be the encoding management circuit 104) includes the controller 302 and the digital circuit 304. The controller 302 is signally connected to the digital circuit 304. The digital circuit 304 may apply Karnaugh maps (for simplification), but the present disclosure is not limited thereto.

Figure 4:
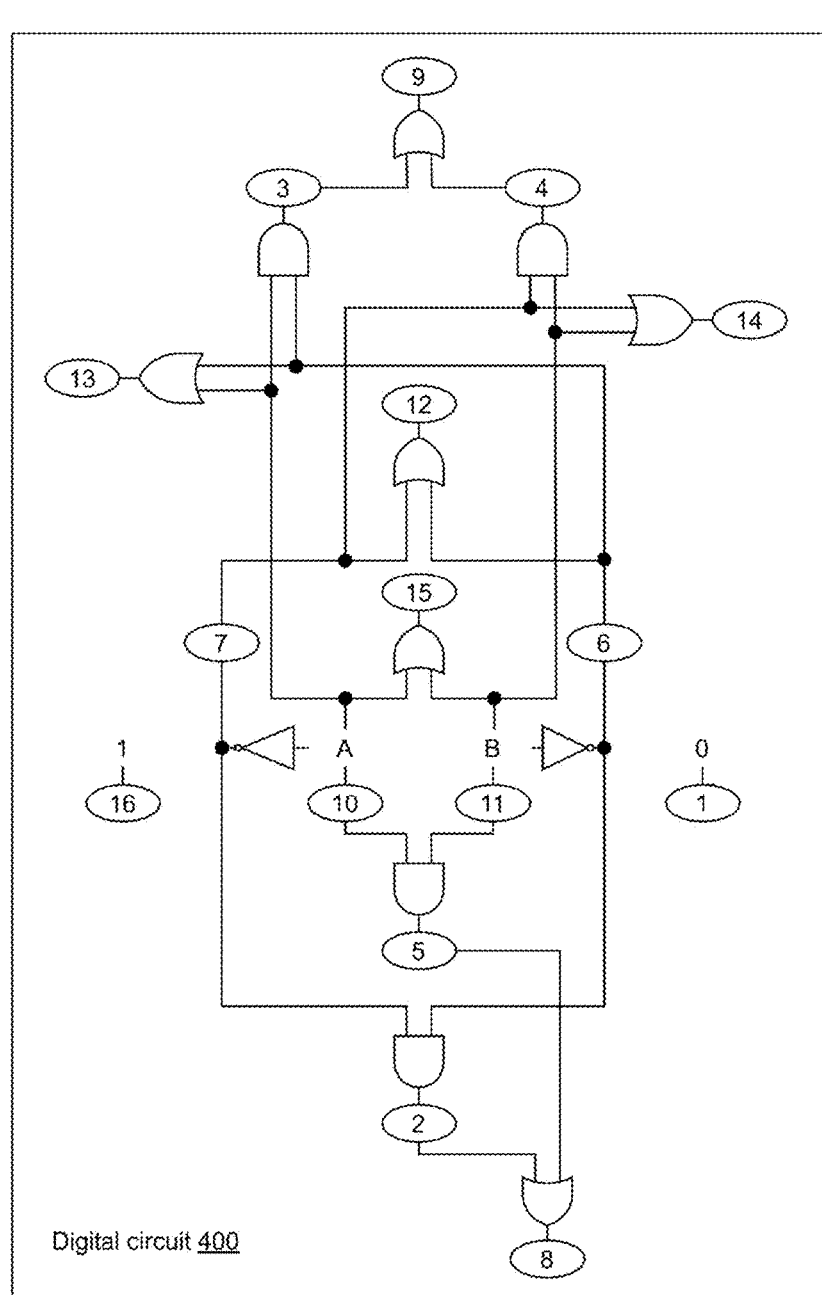
FIG. 4 is a schematic circuit diagram of a digital circuit applying Karnaugh maps according to an embodiment of the present disclosure.

FIG. 4 is a schematic circuit diagram of a digital circuit applying Karnaugh maps (which may be the digital circuit 304) according to an embodiment of the present disclosure. The digital circuit 400 may implement a plurality of encoding functions, also referred to as a plurality of data paths. The plurality of encoding functions may respectively correspond to combinations of addresses and data of a plurality of bad blocks, such as the 16 encoding functions f(x) in FIG. 4. A 2-bit address {A,B} may serve as an input to the encoding function f(x). K may serve as the output from the encoding function f(x). Each encoding function may respectively correspond to a different bad block writing state Sum( . . . ). The plurality of encoding functions include a first encoding function (e.g., f(x)=A'B') and a second encoding function (e.g., f(x)=A'). When the instruction indicates writing first data to the first bad block, the operation of the encoding management circuit 300 updating the encoding management circuit 300 include: the controller 302 may select, from the plurality of encoding functions, a first encoding function corresponding to a first address (mapping information) of the first bad block and the first data (e.g., whether equals the value "1"). When the instruction indicates reading the first bad block, the operation of the encoding management circuit 300 obtaining the simulation data of the bad block based on the address of the bad block includes: the controller 302 may obtain first simulation data of the first bad block based on the first encoding function and the first address of the first bad block, and the controller 302 may output the first simulation data of the first bad block. Specifically, the controller 302 may substitute the first address (mapping information) of the first bad block into the first encoding function to obtain the first simulation data of the first bad block.

In some embodiments, the controller 302 may store the first encoding function in an additional memory (e.g., volatile memory (VM), NVM, register, etc) after selecting the first encoding function.

In some embodiments, when the instruction indicates writing second data to a second bad block, the controller 302 may select, from the plurality of encoding functions, a second encoding function corresponding to the first address of the first bad block, the first data, a second address (mapping information) of the second bad block, and the second data (e.g., whether equals the value "1"). When the instruction indicates reading the first bad block, the controller 302 may obtain second simulation data of the first bad block based on the first address of the first bad block and the second encoding function, and the controller 302 may output the second simulation data of the first bad block. When the instruction indicates reading the second bad block, the controller 302 may obtain first simulation data of the second bad block based on the second address of the second bad block and the second encoding function, and the controller 302 may output the first simulation data of the second bad block. Specifically, the controller 302 may substitute the second address (mapping information) of the second bad block into the second encoding function to obtain the first simulation data of the second bad block. For example, assuming currently only the bad block with the address mapping information equaled to 1=2b'00 is written with the value "1," the controller 302 may apply the encoding function Sum(1), i.e., f(x)=A'B'. Then, when the instruction indicates writing the value "1" to the bad block with the address mapping information equaled to 3=2b'10, the controller 302 may apply the encoding function Sum(1,3), i.e., f(x)=A'. Then, when the instruction indicates reading the bad block with the address mapping information equaled to 1=2b'00, the controller 302 may substitute 1=2b'00 into f(x)=A' to obtain 1. Then, when the instruction indicates writing the value "0" to the bad block with the address mapping information equaled to 1=2b'00, the controller 302 may apply the encoding function Sum(3), i.e., f(x)=A'B.

In FIG. 4, f(sum(0)) may represent that written data of all bad blocks are not specific data (e.g., all written with "0") or none of the bad blocks exist. It should be noted that the encoding function may be initialized as f(sum(0)). f(sum(1, 2,3,4)) may represent that written data of all bad blocks are specific data (e.g., all written with "1"). It should be noted that the digital circuit applying Karnaugh maps is associated with the total number of bad blocks. For example, a 2-bit input may be used to manage up to 4 bad blocks, and a 3-bit input may be used to manage up to 8 bad blocks. When the total number of identified bad blocks exceeds the limit supported by the digital circuit, another digital circuit may be applied.

The following example illustrates that the bad blocks 1, 2, and 3 may be respectively mapped (e.g., encoded addressing) to 1=2'b00, 2=2'b01, and 3=2'b10. A 2-bit address {B,A} may serve as the input to the encoding function f.

After initial power-up, no data has been written to any blocks in the memory, and thus the corresponding encoding function is f(sum(0)). At this point, the simulation data obtained by reading any bad block is the value "0." After writing the value "1" to the bad block 1, only the bad block 1 has been written with the value "1," and thus the encoding management circuit may update the encoding function to f(sum(1))=A'B'. If the bad block 1 (with the encoding address equaled to 2'b00) is read, the encoding management circuit may obtain and output the simulation data of the bad block 1 as 1. Then, after writing the value "1" to the bad block 3, both the bad block 1 and the bad block 3 have been written with the value "1," and thus the encoding management circuit may update the encoding function to f(sum(1, 3))=A'. If the bad block 1 (with the encoding address equaled to 2'b00) is read, the encoding management circuit may obtain and output the simulation data of the bad block 1 as 1. If the bad block 3 (with the encoding address equaled to 2'b10) is read, the encoding management circuit may obtain and output the simulation data of the bad block 3 as 1. Then, after writing the value "1" to the bad block 2, the bad blocks 1, 2, and 3 have all been written with the value "1," the encoding management circuit may update the encoding function to f(sum(1,2,3))=A'+B'. If the bad block 1 (with the encoding address equaled to 2'b00) is read, the encoding management circuit may obtain and output the simulation data of the bad block 1 as 0. If the bad block 2 (with the encoding address equaled to 2'b01) is read, the encoding management circuit may obtain and output the simulation data of the bad block 2 as 1. If the bad block 3 (with the encoding address equaled to 2'b10) is read, the encoding management circuit may obtain and output the simulation data of the bad block 3 as 1. Then, after writing the value "0" to the bad block 1, the bad blocks 2 and 3 have both been written with the value "1," the encoding management circuit may update the encoding function to f(sum(2, 3))=AB'+A'B. If the bad block 2 (with the encoding address equaled to 2'b01) is read, the encoding management circuit may obtain and output the simulation data of the bad block 2 as 1. If the bad block 3 (with the encoding address equaled to 2'b10) is read, the encoding management circuit may obtain and output the simulation data of the bad block 3 as 1.

According to the above embodiments, the following memory management method for handling bad blocks can be obtained (e.g., summarized). FIG. 5 is a schematic flowchart diagram of a memory management method for handling bad blocks according to an embodiment of the present disclosure. Please refer to FIG. 5, the memory management method includes the following steps:

Step S502: Obtain at least one address mapping information of at least one bad block in a memory from an NVM through a memory access instruction decoding unit.

Step S504: Initialize an encoding function f(x) through an encoding management circuit, where x represents the address mapping information of the bad block.

Step S506: Receive an instruction from a bus through the memory access instruction decoding unit.

Step S508: Determine whether the instruction indicates access to one of the at least one bad block through the memory access instruction decoding unit. When the instruction indicates access to one of the at least one bad block, step S510 is performed. When the instruction indicates access to one of at least one normal block in the memory, step S516 is performed.

Step S510: Determine whether the instruction is a write instruction or a read instruction through the memory access instruction decoding unit. When the instruction indicates writing data to a bad block of the at least one bad block, step S512 is performed. When the instruction indicates reading the bad block of the at least one bad block, step S514 is performed.

Step S512: Update the encoding function f(x) through the encoding management circuit. Step S506 is then performed again.

Step S514: Substitute the address mapping information of the bad block into the encoding function f(x) to obtain simulation data of the bad block and output the simulation data of the bad block to the bus through the encoding management circuit. Step S506 is then performed again.

Step S516: Trigger the memory to output actual data of the normal block through the memory access instruction decoding unit. Step S506 is then performed again.

To sum up, the memory management method for handling bad blocks and the memory system provided by the present disclosure may achieve the (automatic) repair and management of the bad blocks in the memory by identifying the bad blocks in the memory through BIST operation and then employing an encoding method when the memory is not allocated with idle/spare units, thereby reducing costs. Specifically, through encoding, additional blocks may not be required for storing the contents of bad blocks, thereby achieving the function of compressing information of the bad blocks. In addition, real-time detection and repair of newly added bad blocks may be achieved. Furthermore, compared to the allocation of more regular memory components (e.g., spare units), digital circuits are more efficient in area utilization and are more suitable for repairing a small number of bad blocks.

It should be understood that the examples and the embodiments described herein are for illustrative purpose only, and various modifications or changes in view of them will be suggested to those skilled in the art, and will be comprised in the spirit and scope of the application and the appendix with the scope of the claims.

What is claimed is:

1. A memory system, comprising:
   a memory;
   an encoding management circuit; and
   a memory access instruction decoding unit, signally connected to the memory and the encoding management circuit, and configured to:
      receive an instruction from a bus;
      identify a bad block in the memory;
      determine whether the instruction indicates accessing to the bad block;
      when the instruction indicates writing data to the bad block, output an address of the bad block and the data to the encoding management circuit to trigger the encoding management circuit to update the encoding management circuit; and
      when the instruction indicates reading the bad block, output the address of the bad block to the encoding management circuit to trigger the encoding management circuit to output simulation data of the bad block,
   wherein the encoding management circuit obtains the simulation data of the bad block based on the address of the bad block, and wherein the memory system further comprising a multiplexer signally connected to the memory, the encoding management circuit, and the memory access instruction decoding unit, wherein when the instruction indicates reading the bad block, the multiplexer receives the simulation data of the bad block from the encoding management circuit and outputs the simulation data of the bad block to the bus, and when the instruction indicates reading a normal block in the memory, the multiplexer receives actual data stored in the normal block from the memory and outputs the actual data to the bus.

2. The memory system according to the claim 1, wherein the encoding management circuit further comprises:
   a digital circuit, configured to implement a plurality of encoding functions, wherein the plurality of encoding functions correspond to combinations of addresses and data of a plurality of bad blocks, respectively; and
   a controller, signally connected to the digital circuit;
   wherein when the instruction indicates writing first data to a first bad block, the controller selects, from the plurality of encoding functions, a first encoding function corresponding to a first address of the first bad block and the first data, and
   when the instruction indicates reading the first bad block, the controller obtains first simulation data of the first bad block based on the first encoding function and the first address of the first bad block, and the controller outputs the first simulation data of the first bad block.

3. The memory system according to the claim 2, wherein when the instruction indicates writing second data to a second bad block, the controller selects, from the plurality of encoding functions, a second encoding function corresponding to the first address of the first bad block, the first data, a second address of the second bad block, and the second data, and
   when the instruction indicates reading the first bad block, the controller obtains second simulation data of the first bad block based on the first address of the first bad block and the second encoding function, and the controller outputs the second simulation data of the first bad block, and
   when the instruction indicates reading the second bad block, the controller obtains first simulation data of the second bad block based on the second address of the second bad block and the second encoding function, and the controller outputs the first simulation data of the second bad block.

4. The memory system according to the claim 2, wherein the controller stores the first encoding function in an additional memory after selecting the first encoding function.

5. The memory system according to the claim 1, wherein the memory access instruction decoding unit identifies the bad block by reading a non-volatile memory (NVM) or by performing a dynamic detection on the memory, wherein the dynamic detection comprises at least one of a periodic detection and a detection in response to receiving the instruction.

6. A memory management method, comprising:
   receiving an instruction from a bus, by a memory access instruction decoding unit;
   identifying a bad block in a memory, by the memory access instruction decoding unit;
   determining whether the instruction indicates accessing to the bad block, by the memory access instruction decoding unit;

when the instruction indicates writing data to the bad block, outputting an address of the bad block and the data to an encoding management circuit, by the memory access instruction decoding unit, and updating the encoding management; and when the instruction indicates reading the bad block, outputting the address of the bad block to the encoding management circuit, by the memory access instruction decoding unit, obtaining simulation data of the bad block based on the address of the bad block and outputting the simulation data of the bad block, by the encoding management circuit.

7. The memory management method according to the claim 6, wherein the encoding management circuit comprises a digital circuit configured to a plurality of encoding functions, the plurality of encoding functions correspond to combinations of addresses and data of a plurality of bad blocks, respectively, and the memory management method further comprises:

when the instruction indicates writing first data to a first bad block, selecting, from the plurality of encoding functions, a first encoding function corresponding to a first address of the first bad block and the first data, by the encoding management circuit; and when the instruction indicates reading the first bad block, obtaining first simulation data of the first bad block based on the first encoding function and the first address of the first bad block and outputting the first simulation data of the first bad block, by the encoding management circuit.

8. The memory management method according to the claim 7, wherein:

when the instruction indicates writing second data to a second bad block, selecting, from the plurality of encoding functions, a second encoding function corresponding to the first address of the first bad block, the first data, a second address of the second bad block, and the second data, by the encoding management circuit;

when the instruction indicates reading the first bad block, obtaining second simulation data of the first bad block based on the first address of the first bad block and the second encoding function and outputting the second simulation data of the first bad block, by the encoding management circuit; and when the instruction indicates reading the second bad block, obtaining first simulation data of the second bad block based on the second address of the second bad block and the second encoding function and outputting the first simulation data of the second bad block, by the encoding management circuit.

9. The memory management method according to the claim 6, wherein the bad block is identified by reading a non-volatile memory (NVM) or by performing dynamic detection on the memory, wherein the dynamic detection comprises at least one of a periodic detection and a detection in response to receiving the instruction, by the memory access instruction decoding unit.

* * * * *